(No Model.)

W. W. DAVIS.
GATE HINGE.

No. 417,234. Patented Dec. 17, 1889.

Witnesses,
J. M. Witherow
R. W. Bishop.

Inventor,
William W. Davis,
By his Attorneys
C. A. Snow & Co.

N. PETERS, Photo-Lithographer, Washington, D. C.

UNITED STATES PATENT OFFICE.

WILLIAM W. DAVIS, OF McAFEE, KENTUCKY.

GATE-HINGE.

SPECIFICATION forming part of Letters Patent No. 417,234, dated December 17, 1889.

Application filed October 19, 1889. Serial No. 327,500. (No model.)

*To all whom it may concern:*

Be it known that I, WILLIAM W. DAVIS, a citizen of the United States, residing at McAfee, in the county of Mercer and State of Kentucky, have invented a new and useful Hinge, of which the following is a specification.

My invention relates to improvements in hinges; and it consists in certain novel features hereinafter described and claimed.

Figure 1:
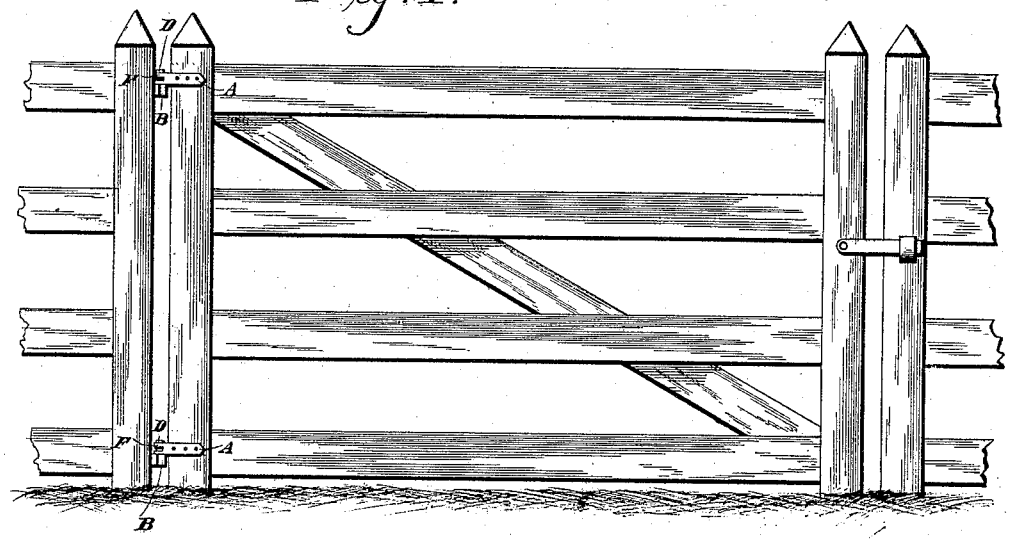
Figures 2, 3:
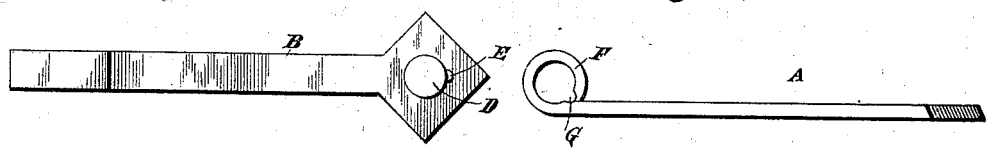
Figure 4:
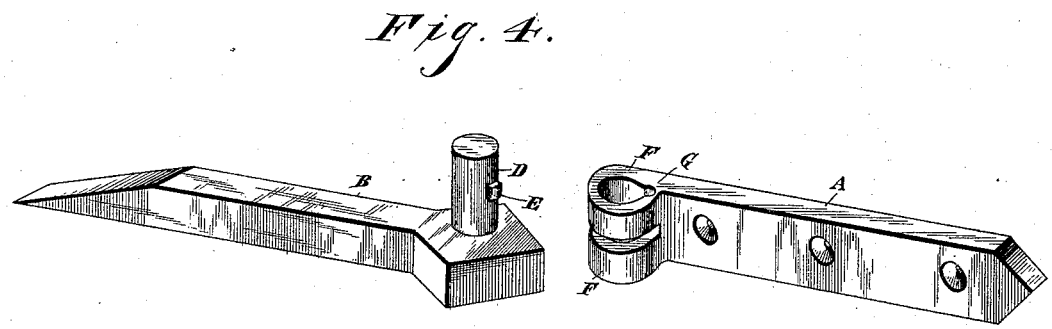
Figure 5:
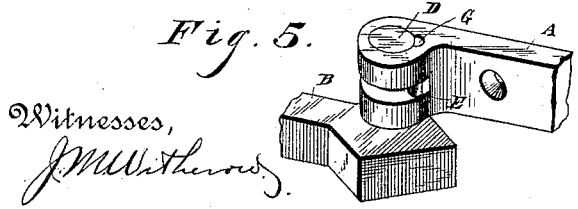

In the accompanying drawings, Figure 1 is a side view of a gate provided with my improved hinge and showing the gate closed. Figs. 2 and 3 are plan views of the hinge detached. Fig. 4 is a detail perspective view of the members of the hinge. Fig. 5 is a detail view with the members of the hinge coupled together, and showing how the pin on the pintle of one member fits in the groove of the knuckle of the other member.

The hinge consists of two members A B, the member A having a leaf C, through which securing-screws are passed to fasten the said member to the gate. The member B is in the form of a spike or wedge, which is driven into the gate-post and thereby secured in position, and it is provided at its outer end on its upper side with the integral pintle D, rising therefrom, as clearly shown. This pintle is provided at about the center of its height and on its outer side with the lug or spur E.

The member A is provided at its outer end with the horizontal eyes or rings F, which are of proper diameter to fit easily over the pintle and are provided on their inner surfaces with the vertical grooves G. These grooves G are adapted to receive the lug or spur E and permit the passage of the same through the eyes, and the space between the eyes is just large enough to admit the lug or spur and allow the same to play therein.

From the foregoing description it will be seen that I have provided a hinge which will allow the gate to swing freely and will prevent the gate rising on the pintle or vibrating thereon, and consequently reduces the wear of the parts. The vertical grooves in the eyes are arranged at such a point that the gate will be prevented from rising when it is closed, but when it is open may be readily lifted from the pintles.

Having described my invention, what I claim, and desire to secure by Letters Patent, is—

The improved hinge herein described and shown, consisting of the member A, having the parallel eyes F at its end separated by a horizontal groove or space, and provided with vertical grooves G in their inner sides, and the member B, having the integral vertical spindle D, provided with a lug E, adapted to pass through the grooves G and play in the space between the eyes, as set forth.

In testimony that I claim the foregoing as my own I have hereto affixed my signature in presence of two witnesses.

W. W. DAVIS.

Witnesses:
  W. A. VANARSDELL,
  W. A. McFATRIDGE.